(12) United States Patent
Afrooze et al.

(10) Patent No.: US 9,615,032 B2
(45) Date of Patent: *Apr. 4, 2017

(54) IMAGING APPARATUS WITH SCENE ADAPTIVE AUTO EXPOSURE COMPENSATION

(71) Applicant: Avigilon Corporation, Vancouver (CA)

(72) Inventors: Sina Afrooze, Vancouver (CA); Guoqian Sun, Vancouver (CA)

(73) Assignee: Avigilon Corporation, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/003,373

(22) Filed: Jan. 21, 2016

(65) Prior Publication Data

US 2016/0142608 A1 May 19, 2016

Related U.S. Application Data

(63) Continuation of application No. 13/752,297, filed on Jan. 28, 2013.

(Continued)

(51) Int. Cl.
*H04N 5/243* (2006.01)
*H04N 5/235* (2006.01)
(Continued)

(52) U.S. Cl.
CPC ............. *H04N 5/2353* (2013.01); *G06T 5/40* (2013.01); *H04N 5/235* (2013.01);
(Continued)

(58) Field of Classification Search
CPC ...... H04N 5/2353; H04N 5/33; H04N 5/2351; H04N 5/235; G06T 5/40; G06T 2207/20072; G06T 2207/10048
See application file for complete search history.

(56) References Cited

U.S. PATENT DOCUMENTS

2004/0109072 A1 6/2004 Gallagher
2005/0057666 A1 3/2005 Hu et al.
(Continued)

FOREIGN PATENT DOCUMENTS

EP 1652000 B1 10/2009

OTHER PUBLICATIONS

International Search Report dated Sep. 12, 2013, issued by the Canadian Intellectual Property Office in corresponding Canadian PCT Application Serial No. PCT/CA2013/050060, filed Jan. 28, 2013.

(Continued)

*Primary Examiner* — Jason Flohre
(74) *Attorney, Agent, or Firm* — Klarquist Sparkman, LLP

(57) ABSTRACT

A method adjusts an auto exposure target in an autoexposure operation on a sequence of images, such as a sequence of infrared images. The method comprises: obtaining a histogram of at least one of the images; applying a weighted histogram table to the histogram to obtain weighted histogram bins wherein at least some bins in the histogram containing saturated pixels are assigned a higher weighting value and at least some bins in the histogram containing unsaturated pixels are assigned a lower weighting value, and summing the weighted histogram bins to obtain a saturation score and decreasing an auto exposure target for an auto exposure operation when the saturation score exceeds a first threshold value, and increasing the autoexposure target when the saturation score is below the first threshold value and the image is underexposed.

18 Claims, 8 Drawing Sheets

Related U.S. Application Data

(60) Provisional application No. 61/752,889, filed on Jan. 15, 2013.

(51) Int. Cl.
 *G06T 5/40* (2006.01)
 *H04N 5/33* (2006.01)

(52) U.S. Cl.
 CPC ........... *H04N 5/2351* (2013.01); *H04N 5/243* (2013.01); *H04N 5/33* (2013.01); *G06T 2207/10048* (2013.01); *G06T 2207/20072* (2013.01)

(56) References Cited

U.S. PATENT DOCUMENTS

| | | |
|---|---|---|
| 2006/0274180 A1 | 12/2006 | Yasuda |
| 2008/0024623 A1 | 1/2008 | Seo et al. |
| 2008/0117318 A1 | 5/2008 | Aoki |
| 2008/0158430 A1 | 7/2008 | Hu |
| 2009/0207265 A1 | 8/2009 | Gough |
| 2012/0002045 A1 | 1/2012 | Tony et al. |
| 2012/0314124 A1 | 12/2012 | Kaizu et al. |
| 2012/0320218 A1 | 12/2012 | Mori et al. |
| 2013/0050570 A1 | 2/2013 | Ishigaki et al. |

OTHER PUBLICATIONS

Written Opinion dated Sep. 18, 2013, issued by the Canadian Intellectual Property Office in corresponding Canadian PCT Application Serial No. PCT/CA2013/050060, filed Jan. 28, 2013.

Office action dated Mar. 26, 2015, issued by the United States Patent and Trademark Office in related U.S. Appl. No. 13/752,297, filed Jan. 28, 2013.

Notice of Allowance dated Sep. 28, 2015, issued by the United States Patent and Trademark Office in related U.S. Appl. No. 13/752,297, filed Jan. 28, 2013.

IMAGING APPARATUS WITH SCENE ADAPTIVE AUTO EXPOSURE COMPENSATION

CROSS REFERENCE TO RELATED APPLICATION

This is a Continuation of U.S. patent application Ser. No. 13/752,297, filed Jan. 28, 2013, which claims the benefit of U.S. Provisional Patent Application No. 61/752,889, filed Jan. 15, 2013, both of which applications are hereby incorporated by reference.

FIELD

This disclosure relates generally to a scene adaptive auto-exposure compensation method and an imaging apparatus operable to perform this method.

BACKGROUND

It is often desirable to use an auto-exposure algorithm in a camera to ensure that the image is acquired at a balanced shutter-time and gain under different lighting conditions. Often the objective of the auto-exposure algorithm is to maintain a constant global luminance for the image by adjusting the shutter-time and gain. The problem with this approach is that if the scene contains objects that are very small (<1% of image pixels) but much brighter than the rest of the image, these objects will be over-exposed and appear saturated in the image. This problem is specifically severe for a camera equipped with an infrared ("IR") illuminator because certain small objects of interest (e.g. license plates) have a much higher IR reflectivity than the rest of the scene. However if the camera ensures that no area of the image is saturated, a small background light in the image can result in the majority of the image being permanently underexposed.

There are several cameras in the market that try to solve the problems of saturated objects as a result of IR-Illumination by simply reducing the intensity of the IR illuminator. Controlling IR intensity to control saturation will only work for a camera with built-in IR illuminator which can be directly controlled. In particular, this approach will not work with cameras that use an external IR illuminator wherein the illumination intensity cannot be directly controlled.

SUMMARY

According to one aspect of the invention, there is provided a method for adjusting an auto exposure target in an auto-exposure operation on a sequence of images, such as a sequence of infrared images. The method comprises obtaining a histogram of an image; applying a weighted histogram table to the histogram to obtain weighted tonal value bins wherein at least some bins in the histogram containing oversaturated pixels are assigned a higher weighting value and at least some bins in the histogram containing non-saturated pixels are assigned a lower weighting value, and summing the weighted histogram bins to obtain a saturation score and decreasing an auto exposure target for an auto exposure operation when the saturation score indicates that the image is oversaturated, and increasing the auto exposure target when the saturation score indicates that the image is non-saturated and when the image is underexposed.

Prior to obtaining a histogram of at the image, the static or mostly static background saturated pixels in the image can be masked by identifying pixels in the image that have exceeded a saturation threshold a selected number of times over a time period; and applying a mask to the identified pixels such that the masked pixels are not included in the histogram. The step of identifying pixels as being static or mostly static background pixels can comprise reading a saturation level of a pixel and incrementing a counter when the pixel exceeds the saturation threshold and identifying the pixel as being a static or mostly static saturated background pixel when the counter exceeds a background saturated pixel threshold value. The method can further comprise unmasking masked pixels by reading a saturation level of a masked pixel and decrementing a counter when the masked pixel falls below the saturation threshold, and removing the mask from the masked pixel when the counter falls below a background saturated pixel threshold value.

The histogram can be obtained from only one out of every selected number of images in the sequence of images, wherein the selected number of images is greater than the number of images in the sequence of images to which the auto-exposure operation is applied. The weighted histogram table can have a weighting value that linearly increases from the bins assigned the lower weighting value to the bins assigned the higher weighting value, wherein the linear increase occurs over a selected range of bins. The higher weighting value can be 1 and the lower weighting value can be 0.

The method can further comprise decreasing the auto exposure target by a first amount when the image is highly oversaturated, and decreasing the auto exposure target by a second amount when the image is slightly oversaturated, wherein the saturation score when the image is highly saturated is higher than the saturation score when the image is slightly saturated. The first amount can be a function of the original auto exposure target, and the second amount can be a function of the global mean exposure level of the image. The images can be infrared images.

According to another aspect of the invention, there is provided an imaging apparatus comprising: an imager; and processing circuitry communicative with the imager to receive an image captured by the imager. The processing circuitry comprises a processor and a memory having encoded thereon program code executable by the processor to perform the aforementioned method.

According to another aspect of the invention, there is provided a method for generating a mask of background saturated objects in an image, comprising: identifying pixels in the image that exceed a saturation threshold a selected number of times over a time period as being static or mostly static background saturated pixels; and assigning a mask flag to each pixel in the image identified as being a mostly static background saturated pixel. The method can further comprise identifying masked pixels in the image that have fallen below a saturation threshold a selected number of times over a time period as being non-saturated pixels, and removing the mask flag from masked pixels that are non-saturated.

The method can further comprise two saturation thresholds, namely an upper saturation threshold above which a pixel is considered saturated and a lower saturation threshold below which a pixel is considered non-saturated. The step of identifying pixels as being static or mostly static background pixels can comprise reading a saturation level of a pixel and incrementing a counter when the pixel exceeds the saturation threshold and identifying the pixel as being a static or mostly static saturated background pixel when the counter exceeds a background saturated pixel threshold value. The step of identifying masked pixels that are non-saturated can comprises reading a saturation level of a masked pixel and decrementing a counter when the masked pixel falls below the saturation threshold and identifying the masked pixel as being non-saturated when the counter falls below a background saturated pixel threshold value.

DETAILED DESCRIPTION

The embodiments described herein provide a scene adaptive auto-exposure compensation method used in an auto-exposure operation of an imaging apparatus, such as a security camera. The scene adaptive auto-exposure compensation method comprises two components, namely a first component which applies a mask to saturated objects in the background of the image ("background saturation mask generator"), and a second component that provides a bias value to different parts of an image histogram when calculating an auto-exposure target value for use in an image-mean based auto-exposure operation ("auto-exposure companion for controlling saturation level"). The first component causes the auto-exposure operation to ignore background saturated objects, which otherwise could cause the auto-exposure operation to underexpose objects of interest in the image. The second component controls the saturation levels in the image by reducing the auto exposure target value of the auto-exposure operation when certain parts of the image are oversaturated, and returning the auto-exposure target value back to the original auto-exposure target value when no area in the image is oversaturated or the oversaturated areas are masked by the backgrounds saturation mask.

In other words, the method embodied by the present embodiments controls exposure (shutter time and gain) to prevent saturation in an IR-illuminated scene, instead of conventional approaches which prevent saturation by controlling the intensity of the IR illuminator. This enables the method to be used in imaging apparatuses that have built-in or external IR illuminators, since controlling IR illumination intensity is not used to control saturation levels. Also, the method, by preventing or at least reducing saturation in the image and ignoring saturated background objects, is expected to improve image quality and in particular preserve image detail for objects of interest in the image. A further benefit of preventing or reducing saturation by controlling exposure is the ability to reduce motion-blur for moving objects in the image by reducing the exposure of the image.

The method is embodied as program code stored on a memory of an imaging apparatus and executed by a processor in that apparatus. The imaging apparatus can feature an on-board IR illuminator like that shown in FIGS. 1A and 1B, or use an external IR illuminator like that shown in FIG. 1C.

Figure 1A:
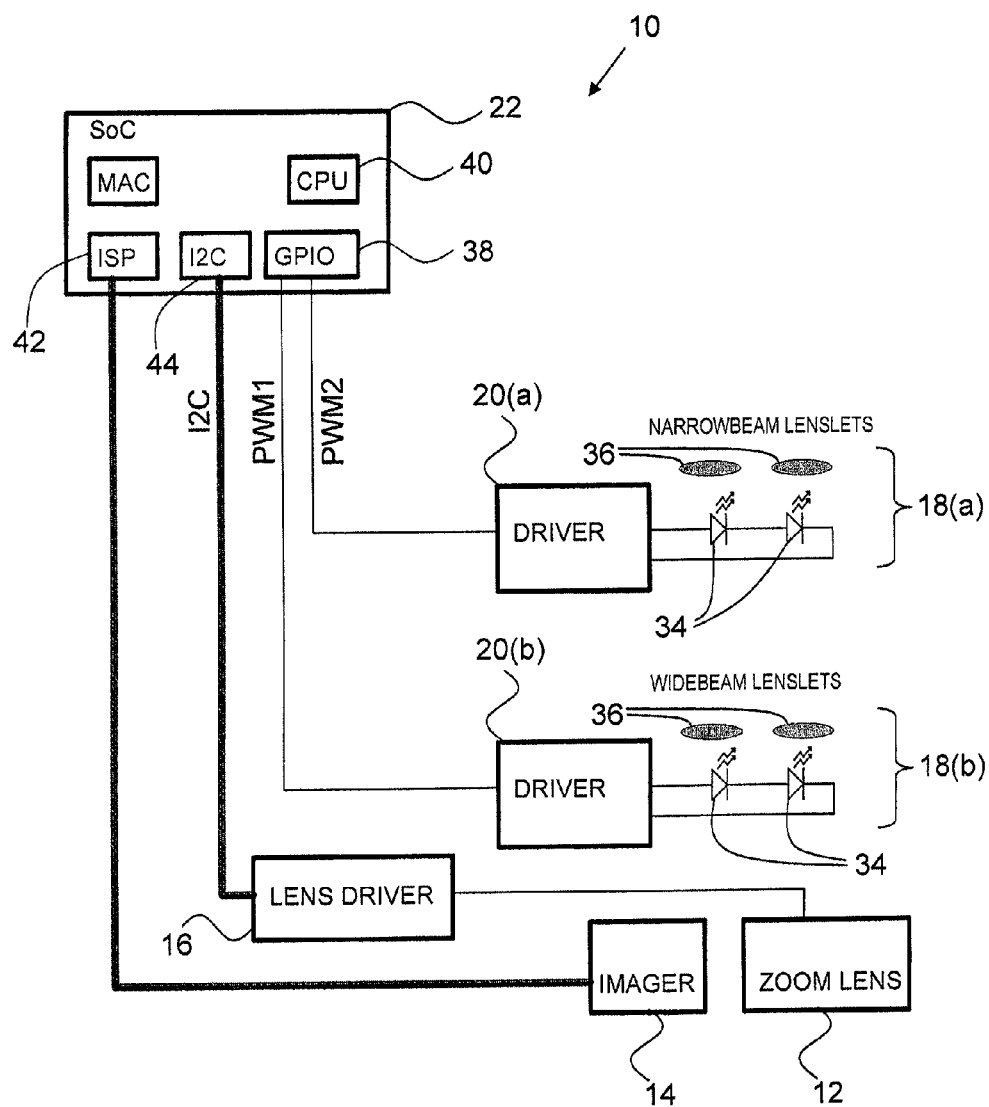
FIGS. 1A, 1B and 1C are schematic block diagrams of three embodiments of an imaging apparatus, wherein a first embodiment comprises an imaging apparatus with an IR illuminator having a pair of infrared emitting diode (IRED) sets, a second embodiment comprises an imaging apparatus having an IR illuminator with one IRED set, and a third embodiment comprises an imaging apparatus that uses an external IR illuminator to provide IR illumination. Each embodiment also comprises a memory having encoded thereon a program executable to perform a scene adaptive auto-exposure compensation method for an auto exposure operation.

Referring now to FIG. 1A, an imaging apparatus 10 according to one embodiment comprises the following major components: a zoom lens 12, an imager 14 optically coupled to the zoom lens 12, a lens driver 16 mechanically coupled to the zoom lens 12 and operable to change the focal length of the zoom lens, an IR illuminator 18 comprising a pair of IR emitters 18(a), 18(b) each producing an IR illumination beam with a different linear profile (respectively, "wide angle IR emitter" 18(a) and "narrow angle IR emitter" 18(b)), a current driver 20(a), 20(b) for each IR emitter 18(a), 18(b), and control and processing circuitry 22 communicative with the imager 14, lens driver 16, and current drivers 20(a), 20(b).

Figure 2:
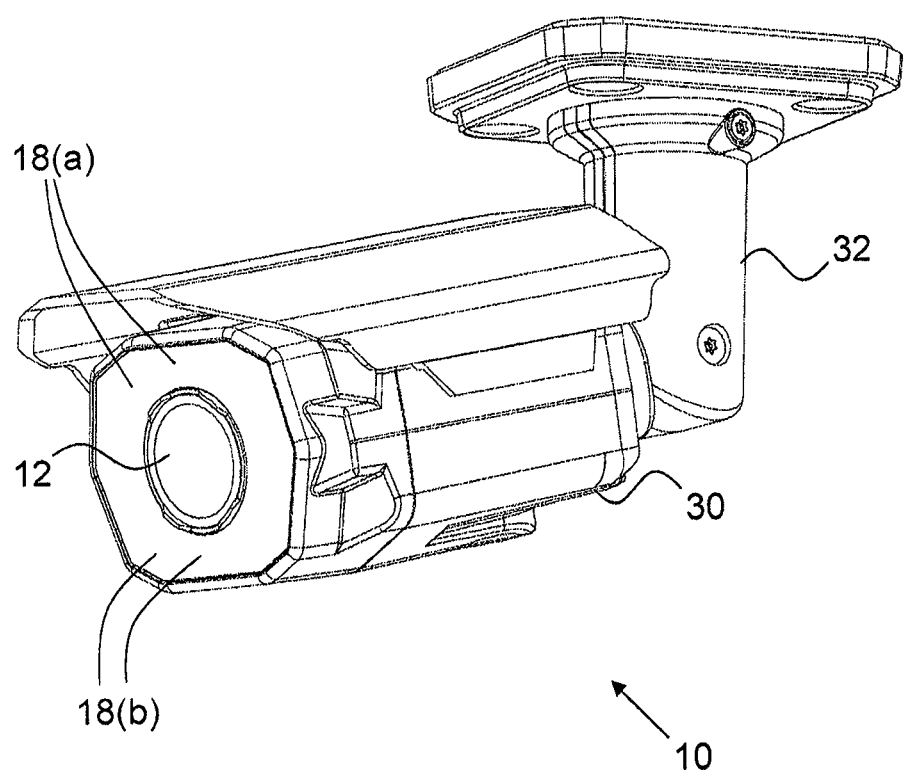
FIG. 2 is a perspective view of the imaging apparatus embodied as a security camera.

The imaging apparatus 10 can be embodied as a security camera such as that shown in FIG. 2. The security camera 10 has a housing 30 which houses the aforementioned major components of the imaging apparatus, and a movable mount 32 for mounting the camera 10 to a surface such as a ceiling. The zoom lens 12 is mounted at the front of the camera 10, and a printed circuit board ("PCB", not shown) is also mounted at the front of the camera 10 around the zoom lens 12; the wide angle IR emitter 18(a) and narrow angle IR emitter 18(b) are respectively mounted on this PCB and face the same direction as the zoom lens 12 and serve to illuminate the field of view of the zoom lens with infrared light.

Each IR emitter 18(a), 18(b) in this embodiment comprises a set of infrared emitting diodes (IRED) 34. Such IRED sets are known in the art; one suitable such IRED set comprises a pair of Osram SFH4715S IREDs. Each IR emitter 18(a), 18(b) also comprises a lenslet 36 for each IRED 34; the lenslet 36 is configured to shape the IRED emission into an IR beam having a particular illumination pattern and a particular linear profile. In particular, the lenslets 36 for the wide angle IR emitter 18(a) will produce an IR beam with a linear profile that is relatively widely dispersed (hereinafter referred to as the "wide beam component"), and the lenslets 36 for the narrow angle IR emitter 18(b) will produce an IR beam with a linear profile that is relatively narrowly dispersed, i.e. (hereinafter referred to as the "narrow beam component"). Such lenslets are known in the art; one suitable such lenslet can be provided by Ledil.

The current drivers 20(a), 20(b) are designed to regulate the current delivered to the IR emitters 18(a), 18(b). The current drivers 20(a), 20(b) can be controlled to deliver all of the total available power to one or the other of the IR emitters 18(a), 18(b), or vary the power ratio between the two emitters 18(a), 18(b). Such current drivers are known in the art; one suitable such current driver is the AL8805 Buck LED Driver by On Semiconductor. The current drivers 20(a), 20(b) are communicatively coupled to a general purpose input/output (GPIO) pin 38 on a circuit board inside the housing which contains the processing circuitry 22 (otherwise known as main system on chip (SoC)) of the surveillance camera 10. The processing circuitry 22 comprises a interface bus with pins 42, 44 that are communicatively coupled to the lens driver 16 and imager 14. The imager 14 is configured to capture light in the infrared spectrum, and can be for example, a digital sensor such as a complementary metal-oxide-semiconductor (CMOS) sensor. The specifications of the imager 14 and the zoom lens 12 can be selected based on an operator's requirements and performance expectations. Operation of zoom lenses and imaging sensors in a surveillance camera are well known in the art and thus the operation of the imager 14, lens driver 16 and zoom lens 12 are not described in further detail here.

The processing circuitry 22 also includes a processor and a memory (CPU) 40 having encoded thereon program code that is executed by the processor to operate the security camera 10. This program code includes instructions for sending a control signal from the GPIO pin 38 to the current drivers 20(*a*), 20(*b*) to produce the IR beam. The program code can also include instructions for combining the wide beam component and narrow beam component in one or more different power ratios to produce a combined IR beam having different linear profiles. As will be described in further detail below, the program code also includes instructions for performing an auto-exposure operation and the scene adaptive auto-exposure compensation method that can be used in the auto-exposure operation.

Figure 1B:
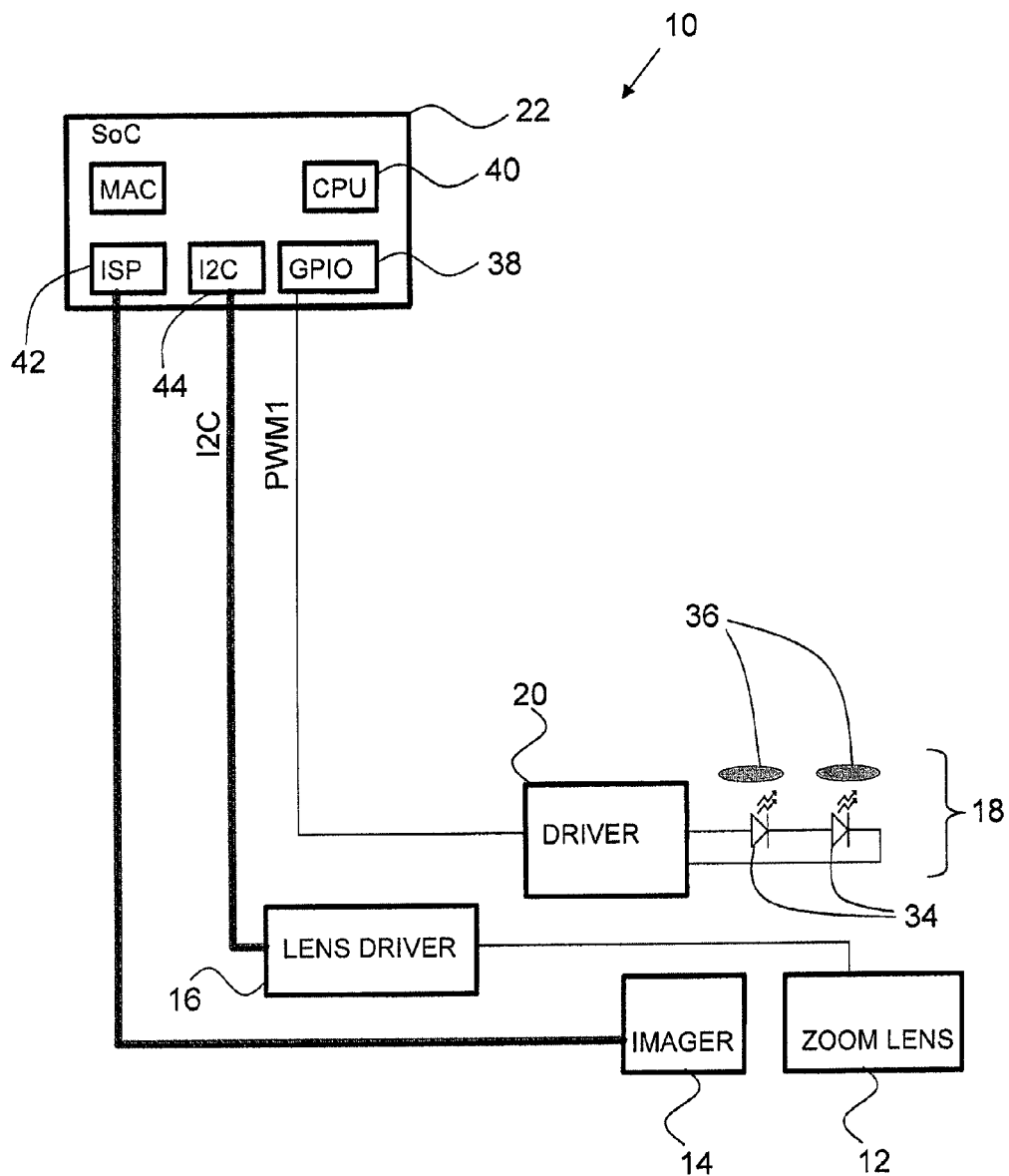

Referring now to FIG. 1B, the second embodiment of the imaging apparatus 10 is the same as the first embodiment except that this imaging apparatus only consists of a single IRED set, to produce a fixed-width (i.e. non-varying linear profile) IR illumination beam instead of a variable-width IR illumination beam (i.e. variable linear profile). Like the first embodiment, this second embodiment also comprises processing circuitry 22 having a memory encoded with program code that includes instructions for performing an auto-exposure operation and the scene adaptive auto-exposure compensation method that can be used in the auto-exposure operation.

Figure 1C:
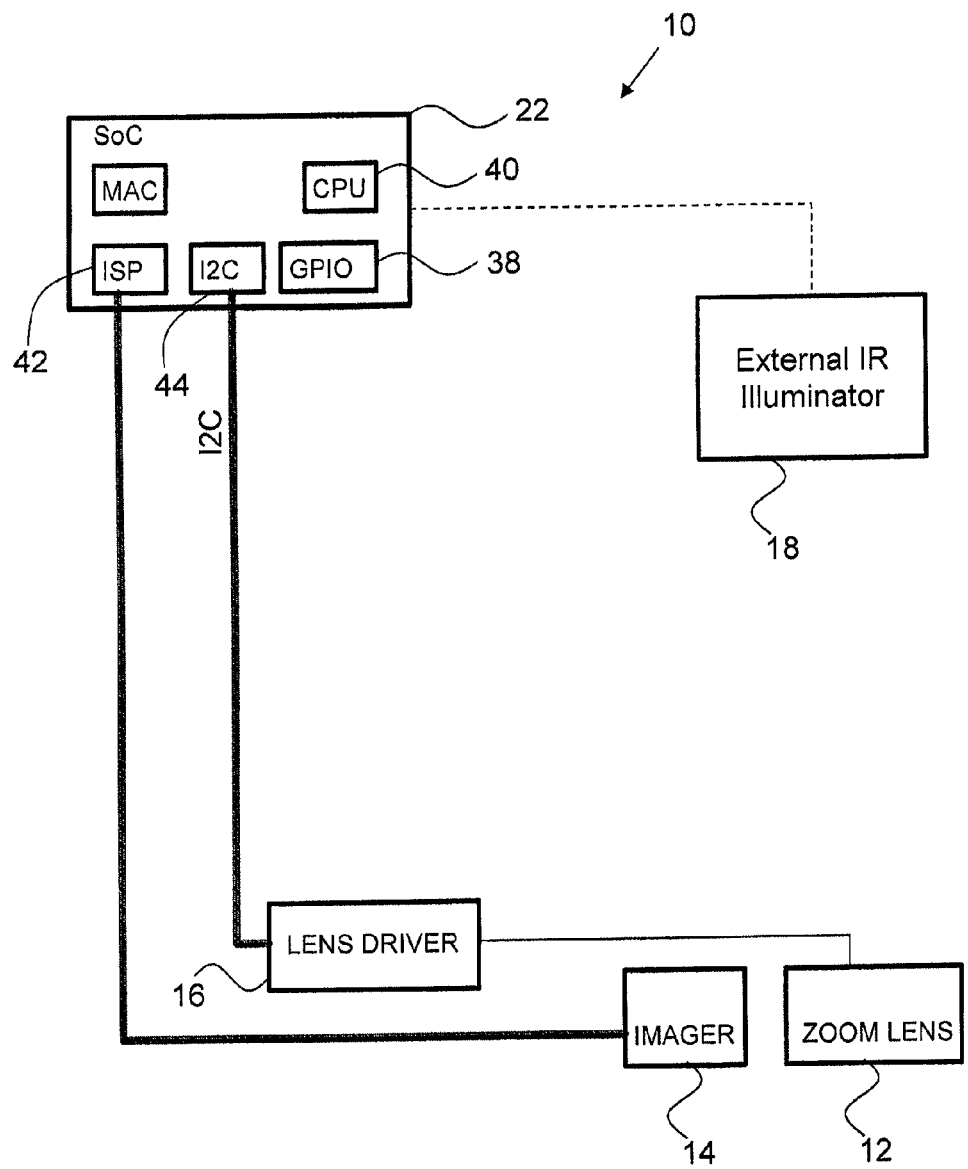

Referring now to FIG. 1C, the third embodiment of the imaging apparatus 10 is the same as the first and second embodiments except that this imaging apparatus does not have a built-in IR illuminator but instead uses an external IR illuminator to illuminate a scene. Like the first and second embodiments, this third embodiment also comprises processing circuitry 22 having a memory encoded with program code that includes instructions for performing an auto-exposure operation and the scene adaptive auto-exposure compensation method that can be used in the auto-exposure operation.

Scene Adaptive Auto-exposure Compensation Method

Referring now to FIGS. 3, 4, 5A and 5B, the scene adaptive auto-exposure compensation method will now be described in detail. As noted above, the method comprises two components, namely (1) a scene adaptive background saturation mask generator; and (2) an auto-exposure companion for controlling saturation level. The first component will create a mask that identifies regions of the image that are saturated but can be considered static or mostly static and part of the background; this mask can be used by the second component to ignore background saturated regions when controlling the saturation level of the image. The second component ensures that the saturation level of the image stays below a threshold level (typically 0) by processing a histogram of the image using a weighted histogram table, and setting new auto-exposure targets for the auto-exposure operation when the processed histogram values do not meet a target threshold range.

The auto-exposure operation can be based on a conventional image-mean based auto-exposure algorithm that adjusts the exposure of a series of images (frames) taken over a time period. Such conventional auto-exposure algorithms are well known in the art and thus the auto-exposure operation is not described in detail here.

Figure 4:
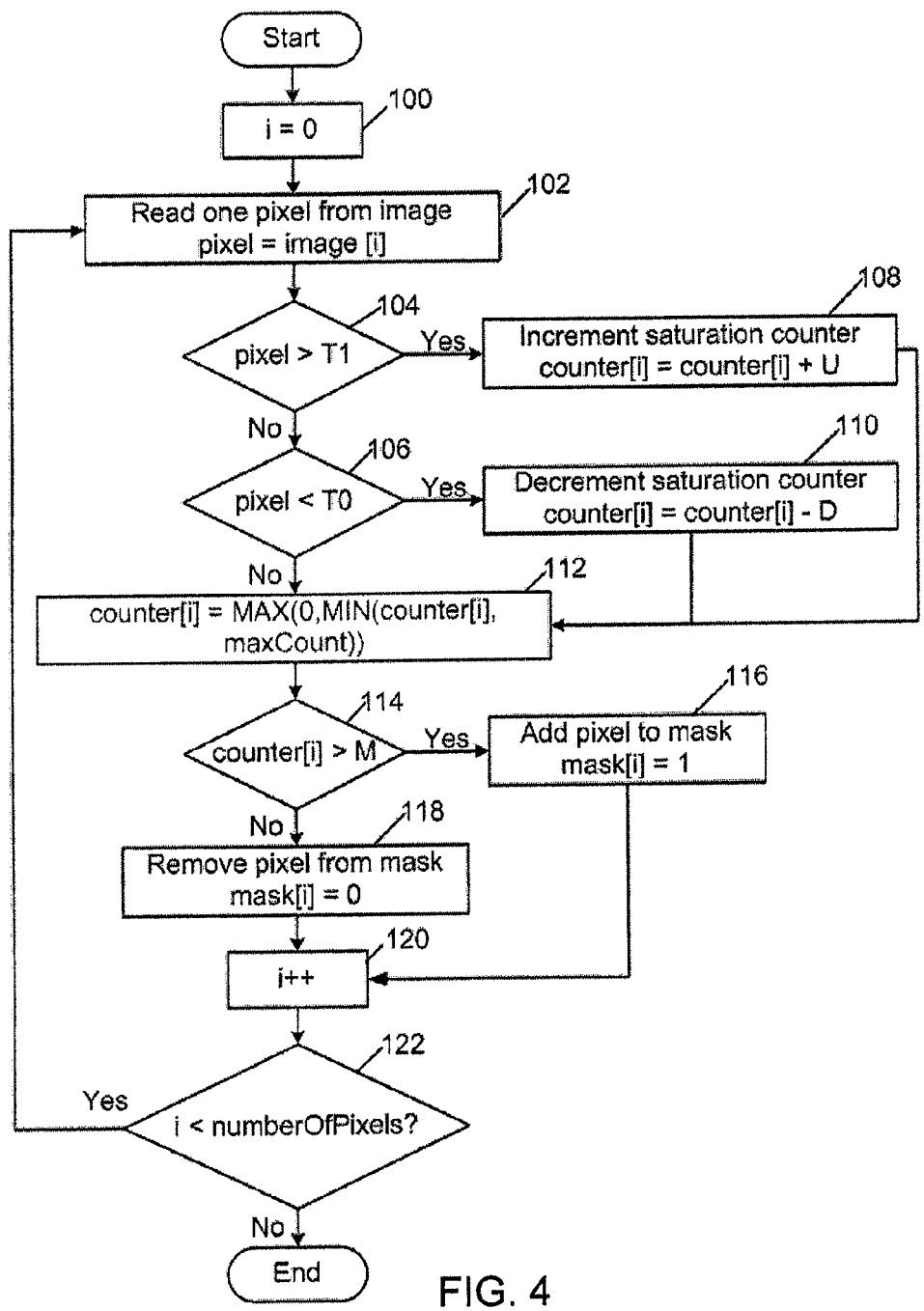
FIG. 4 is a flow chart showing steps of a first component of the scene adaptive auto-compensation method, namely steps for generating a background saturation mask.

Referring particularly to FIG. 4, the scene-adaptive background saturation mask comprises a series of instructions executed by the processor to identify saturated pixels in the image that are static or mostly static and therefore can be considered part of the background of the image (the assumption being that at least for security surveillance purposes, objects of interests will be moving in the image). Static and mostly static objects that are found to be saturated will be masked, i.e. ignored by the auto-exposure companion for controlling saturation level of the image. This ensures that the exposure will not stay at very small values if the image background contains small bright objects such as street lights.

The background saturation mask component of the method operates by processing each pixel i of every single captured image ("image[i]") on a pixel by pixel basis (from i=0 to NumberOfPixels). Starting with the first pixel i=0 (step 100), the saturation level of each pixel i is read (102); assuming that saturation level is represented by one byte of data, there can be 256 measurable saturation levels t from t=0 to 255.

The read saturation level of each pixel i is compared to an upper saturation threshold T1 above which the pixel is considered saturated (step 104), and a lower saturation threshold T0 below which the pixel is considered not-saturated (step 106). The values of these thresholds being dependent on the type of sensor used; typical values can be for example, T1=200 and T0=190 for a saturation range having 256 saturation levels.

Alternatively but not shown in FIG. 4, only one saturation threshold T can be provided above which the pixel is considered saturated, and below which the pixel is considered not saturated.

To determine whether the pixel represents a static or mostly static saturated object, a counter ("counter[i]") is provided which is increased by increment U when the read saturation level exceeds the upper saturation threshold T1 (step 108), and decreased by decrement D when the read saturation level is below the lower saturation threshold T0 (step 110). A clipping function is applied to keep the counter value between 0 and a selected maximum ("maxCount") (step 112); when the counter fall below 0, counter[i] will be set to 0, and when the counter exceeds maxCount, counter[i] will be set to maxCount. If the read saturation level is equal to or between the upper and lower saturation thresholds T1, T0, the counter is not changed.

The counter value counter[i] is then compared to a background saturated pixel threshold value M representing a threshold above which the pixel i is considered static or mostly static and saturated (step 114). When the counter value counter[i] is above this threshold, then the subject pixel i is added to the mask by associating a mask flag with this pixel and storing this flag in the memory (step 116); if this pixel i already contains a mask flag (previously determined by the method for an earlier image), then no action is taken and the mask flag remains associated with that pixel i.

When the counter value counter[i] is below the background saturated pixel threshold value M, the subject pixel is removed from the mask by deleting the mask flag associated with this pixel (step 118) if such mask flag exists. If there is no mask flag associated with this pixel, then no action is taken.

The background saturation mask component method is now completed for the subject pixel and the method now advances to the next pixel in the image (step 120) and steps 102-118 are repeated (step 122). Once all the pixels i in the image have been processed, the method advances to the next image in time sequence and the method is carried out again on a pixel by pixel basis.

It can be seen that the time constant for determining when a pixel is considered a background saturated pixel can be adjusted by adjusting either or all of the background saturated pixel threshold value M, and the increment and decrement values U, D. Adjusting these values will essentially adjust the period of time (number of image frames) for determining when a pixel is considered sufficiently static to be considered part of the background. For example, increasing threshold M will cause the method to take longer (process more image frames) for the counter value to increase to threshold M. Conversely, increasing increment U will decrease the period of time it will take the counter to reach threshold M These values M, U, D can be adjusted based on trial and error to calibrate the method to accurately determine whether a bright object is static (each iteration of the method will advance counter by U increments) or moving (one or more iterations of the method will increment the counter when the bright object is within the field of view of the pixel, and will decrement the counter when the bright object has moved out of the field of view of the pixel).

It can also be seen that the method can be calibrated to capture "mostly static" objects like blinking lights as background saturated objects, by adjusting the increments U and D appropriately. For example, U can be assigned a higher value than D in which case the counter will slowly increment over a number of image frames until counter[i] is greater than threshold M. For example, U can be assigned a value of 2 and D assigned a value of 1.

Figure 3:
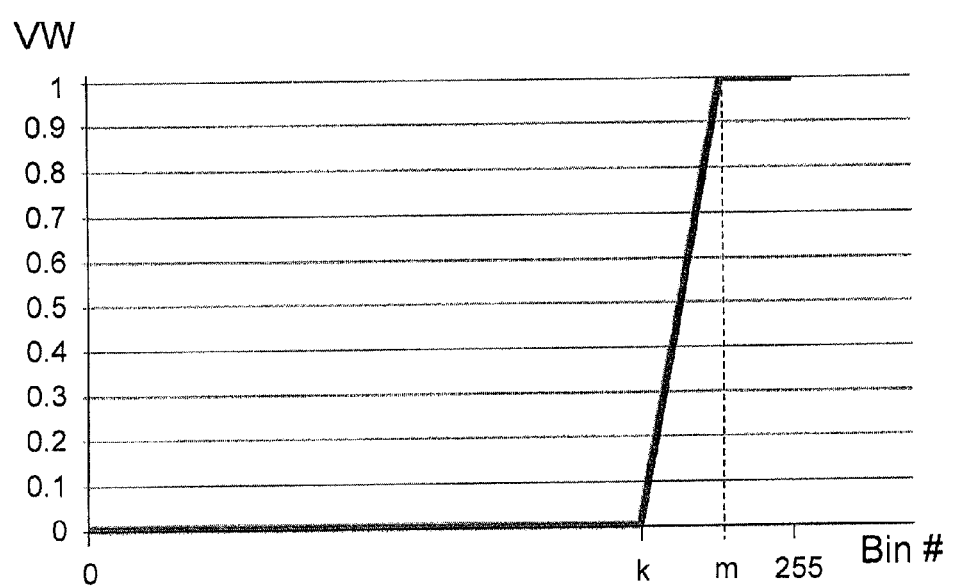
FIG. 3 is an exemplary histogram weighting table to be applied to a histogram of an image captured by the imaging apparatus in carrying out the scene adaptive auto-compensation method.
Figure 5A:
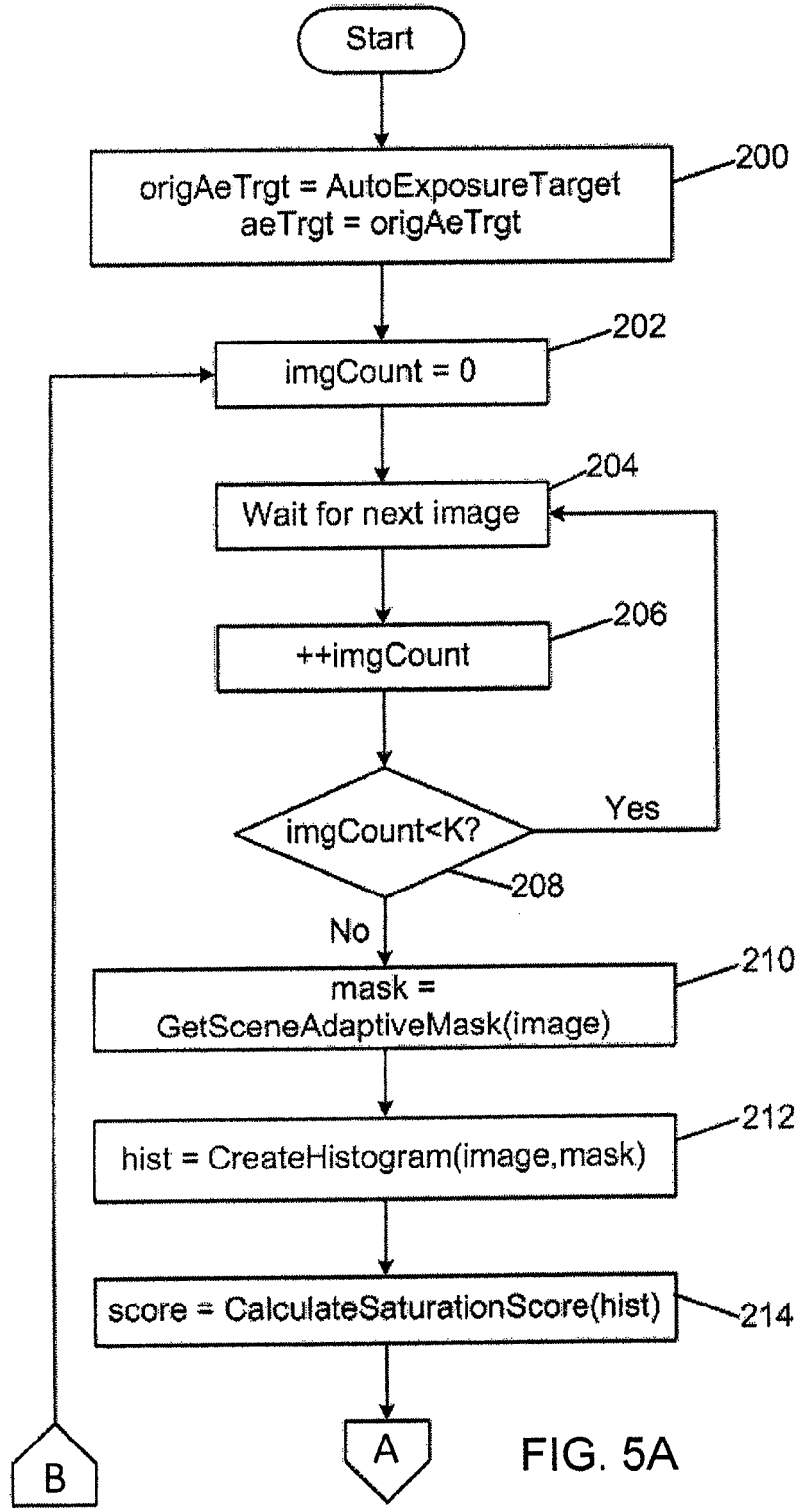
FIGS. 5A and 5B are a flow chart showing steps of a second component of the scene adaptive auto-compensation method, namely steps for controlling saturation level in an auto-exposure operation.
Figure 5B:
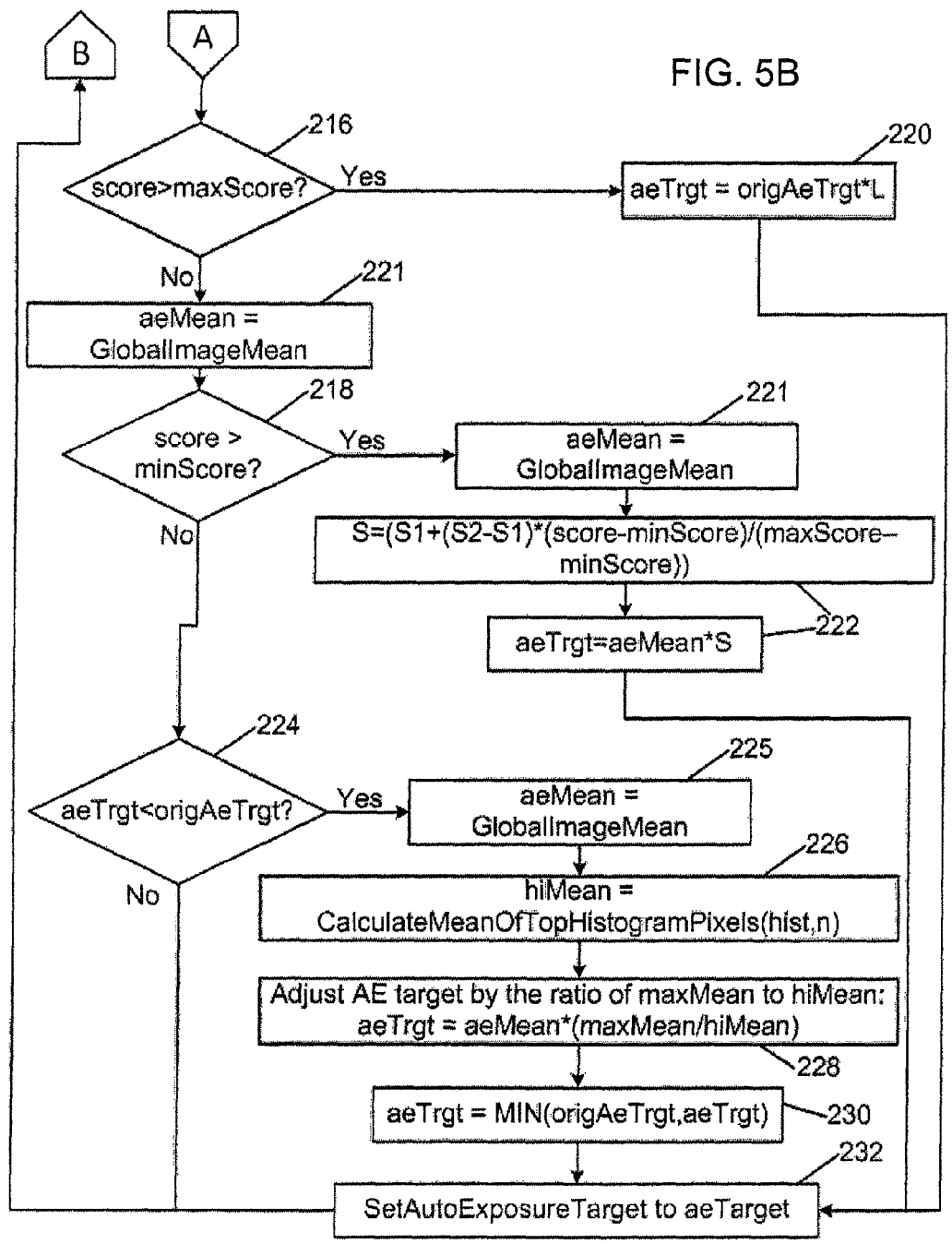

Referring now to FIGS. 3, 5A and 5B, the auto-exposure companion for controlling saturation level component of the method ("auto exposure companion component") involves creating a histogram of an image after background saturated objects have been masked by the background saturated masking generator, then applying a weighted histogram table to the histogram to obtain a "saturation score" which can be considered to be the degree of which the image is saturated, and which is used to determine whether new auto-exposure target values should be used by the auto-exposure operation when the image is found to be oversaturated or non-saturated but underexposed. It is expected that when the auto-exposure operation utilizes the auto-exposure companion of the present method, that the saturation level of the image can be kept below a threshold value thereby improving image quality especially in parts of the image that are of interest.

The auto-exposure companion component of the method starts by assigning a current auto exposure target value ("aeTrgt") to be equal to the original auto-exposure target associated with the auto-exposure operation ("origAeTrgt") (step 200). The original auto-exposure value can be defined by the user or preset in the auto-exposure operation program code. Then a series of steps (steps 204-208) are carried out to execute the auto-exposure companion component on only one out of every selected number K of image frames in order to ensure that the auto-exposure companion component loop and the auto-exposure operation loop do not interact in way that causes image instability. For example, K can be four, in which case a counter ("imgCount") is deployed to count each image frame (step 206) and ensure that the auto-exposure companion is performed on every fourth image frame in sequence (step 208).

The background saturation mask generator is applied to the images including the Kth image to which the auto-exposure companion component is applied (step 210), in the manner as described above. Then, an image histogram of the masked image is obtained in a manner that is well known in the art (step 212). An image histogram is a type of histogram that acts as a graphical representation of the tonal distribution in a digital image. It plots the number of pixels for each tonal value bin across a range of tonal values.

Then, a histogram weighting table like the one shown in FIG. 3 is applied to the histogram to obtain the saturation score of the image (step 214). The histogram weighting table assigns a weighting value WV to each bin of the histogram; for example, for an image histogram having a tonal range of one byte, there will be 256 separate bins (bin[0] to bin[255]) each representing a different tonal value. The histogram weighting table assigns a weighting value of 0 for all tonal value bins that are considered to be non-saturated, from the lowest tonal value (bin[0]) to a first selected tonal value k (bin[k−1]), and assigns a weighting value of 1 for all tonal value bins that are considered to be oversaturated, from a second selected tonal value m [bin m+1] to the highest tonal value (bin[255]). The weighting value linearly increases from 0 to 1 from bin[k] to bin[m] in other to provide a smooth transition during exposure changes. The first and second tonal values k, m can be selected based on what an operator would consider to be acceptable amount of saturation in the image, and can for example be 200 and 230 respectively. The saturation score ("SaturationScore") is the sum of the multiplication of each histogram bin ("Historgam[i]") with its corresponding weighting value ("WeightingTable[i]"):

$$SaturationScore = \sum_{i=0}^{255} \text{Histogram}[i] * WeightingTable[i]$$

Once the saturation score has been determined for the image, the saturation score is compared to an upper threshold value maxScore (step 216) and a lower threshold value minScore (step 218). When the saturation score is higher than the upper threshold value maxScore the image is considered highly oversaturated, and when the saturation score is below the lower threshold value minScore the image is considered not saturated. When the saturation score is between maxScore and minScore the image is considered slightly oversaturated. As will be discussed below, steps are taken to lower the auto exposure target when the image is considered oversaturated in order to reduce the degree of saturation in the image, and to increase the auto exposure target when the image is considered not saturated and under exposed to improve the exposure in the image without causing the image to be oversaturated.

The values of maxScore and minScore are determined empirically and will depend on the imager used and operator preferences. A typical value for maxScore can be 20 pixels and a typical value for minScore can be 0.

When the saturation score is above maxScore, the current auto-exposure target aeTrgt is reduced by a large constant factor L from its original value origAeTrgt (step 220) in order to cause the exposure to reduce relatively rapidly, wherein aeTrgt=origAeTrgt*L The large constant factor L is empirically determined and can depend on operator preferences. A typical value for L can be 0.1. The auto exposure target for the auto exposure operation (AutoExposureTarget) is then set to the current auto exposure target aeTrgt (step 232), the auto exposure operation is executed to adjust the exposure to meet the new auto exposure target and the method returns to step 202.

When the saturation score is between minScore and maxScore, the current auto exposure target aeTrgt is reduced from the current global mean exposure level of the image (GlobalImageMean) by a small constant factor S, in order to cause the exposure to reduce relatively slowly (step 222):

aeTrgt=aeMean*S wherein aeMean=GlobalImageMean (step 221)

The small constant factor S has a higher value than the large constant factor L and can be a factor that is linearly interpolated between values S1 and S2 based on the saturation score and determined by:

S=(S2+(S2−S1)*(saturationscore−minScore)/(maxScore−minScore))

wherein S1 and S2 represent the degree of change in the auto-exposure target. S1 and S2 are empirically determined and can depend on user preferences. S1 is larger than S2 and can for example be 0.9 and 0.5 respectively. The auto exposure target for the auto exposure operation (AutoExposureTarget) is then set to the current auto exposure target aeTrgt (step 232), the auto exposure operation is executed to adjust the exposure to meet the new auto exposure target and the method returns to step 202.

When the saturation score is smaller than minScore, the image is considered to be non-saturated and the auto-exposure target aeTrgt is increased if the image is underexposed; underexposed in this context means that the pixels having the highest tonal values in the image have a mean tonal value that is below a tonal value threshold above which a pixels is considered oversaturated. Alternatively, underexposed can mean when the pixel having the highest tonal value in the image is less than the tonal value threshold. Assuming the current auto exposure target aeTrget is smaller than the original auto exposure target (step 224), a series of steps are carried out to increase the auto exposure target, provided the image is in fact underexposed. In order to determine if the image is underexposed, the mean tonal value of a selected number of upper pixels n of the histogram hiMean is determined (Step 226). In other words, the n pixels in the image with the highest tonal values are identified and the mean of their tonal values is determined. The value of n is empirically determined; a typical value for n can be 10. Then, a constant value maxMean is selected which represents the tonal value threshold above which a pixel is considered oversaturated; this value can be empirically determined and will be in part dependent on the imaging sensor used to capture the image. A typical value for maxMean is a value that is less than or equal to the second selected total value m used in the histogram weighting table, which in this case is 230.

Since the saturation score is less than minScore, hiMean should be close to maxMean. The auto-exposure target is then set to the current global mean exposure level of the image (aeMean=GlobalImageMean) (step 225) scaled by the ratio between hiMean and maxMean (step 228):

aeTrgt=aeMean*(maxMean/hiMean)

Therefore, when hiMean is less than maxMean the ratio is greater than 1 and the auto exposure target will be set at a value that is greater than the current global mean exposure level of the image. It can be seen that when hiMean equals maxMean, the image is not considered to be underexposed and thus the auto exposure target is set to the global mean exposure level of the image.

The auto exposure target should not be increased above the original auto exposure target; if the above scaling results in the autoexposure target aeTrgt being greater than the original auto exposure target origAeTrgt then the auto exposure target is set to equal the original auto exposure target (step 230):

aeTrgt=MIN(origAeTrgt,aeTrgt)

Finally the auto exposure target for the auto exposure operation (AutoExposureTarget) is set at the current auto exposure target aeTrgt and the auto exposure operation is executed, and the method returns to step 202.

While the present invention has been described herein by the preferred embodiments, it will be understood to those skilled in the art that various changes may be made and added to the invention. The changes and alternatives are considered within the spirit and scope of the present invention.

What is claimed is:

1. A method for adjusting an auto exposure target in an auto-exposure operation on a sequence of images, comprising:
   identifying pixels in an image that have repeatedly exceeded a saturation threshold;
   obtaining a histogram of the image in which the identified pixels are excluded;
   applying a weighted histogram table to the histogram to obtain weighted tonal value bins wherein at least some bins in the histogram containing oversaturated pixels are assigned a higher weighting value and at least some bins in the histogram containing non-saturated pixels are assigned a lower weighting value; and
   summing the weighted histogram bins to obtain a saturation score and decreasing an auto exposure target for an auto exposure operation when the saturation score indicates that the image is oversaturated, and increasing the auto exposure target when the saturation score indicates that the image is non-saturated and when the image is underexposed.

2. The method as claimed in claim 1 further comprising applying a mask to the identified pixels.

3. The method as claimed in claim 1 wherein-the identifying comprises reading a saturation level of a pixel and incrementing a counter when the pixel exceeds the saturation threshold and identifying the pixel as being a static or mostly static saturated background pixel when the counter exceeds a background saturated pixel threshold value.

4. The method as claimed in claim 2 further comprising unmasking masked pixels by reading a saturation level of a masked pixel and decrementing a counter when the masked pixel falls below the saturation threshold, and removing the mask from the masked pixel when the counter falls below a background saturated pixel threshold value.

5. The method as claimed in claim 1 wherein the histogram is obtained from only one out of every selected number of images in the sequence of images, wherein the selected number of images is greater than the number of images in the sequence of images to which the auto-exposure operation is applied.

6. The method as claimed in claim 5 wherein the weighted histogram table has a weighting value that linearly increases from the bins assigned the lower weighting value to the bins assigned the higher weighting value, wherein the linear increase occurs over a selected range of bins.

7. The method as claimed in claim 6 wherein the higher weighting value is 1 and the lower weighting value is 0.

8. The method as claimed in claim 7 further comprising decreasing the auto exposure target by a first amount when the image is highly oversaturated, and decreasing the auto exposure target by a second amount when the image is slightly oversaturated, wherein the saturation score when the image is highly saturated is higher than the saturation score when the image is slightly saturated.

9. The method as claimed in claim 8 wherein the first amount is a function of the original auto exposure target, and the second amount is a function of the global mean exposure level of the image.

10. The method as claimed in claim 1 wherein the images are infrared images.

11. The method as claimed in claim 1 wherein the image is underexposed when a selected number of pixels with the highest tonal values in the image have a mean tonal value that is below a tonal value threshold above which a pixel is considered oversaturated.

12. The method as claimed in claim 11 wherein the auto exposure target is increased by the global mean exposure level of the image multiplied by the ratio of the tonal value threshold above which a pixel is considered oversaturated to the mean tonal value of the selected number of pixels having the highest tonal values in the image.

13. An imaging apparatus comprising:
   (a) an imager; and
   (b) processing circuitry communicative with the imager to receive an image captured by the imager, the processing circuitry comprising a processor and a memory having encoded thereon program code executable by the processor to perform a method of adjusting an auto exposure tar et in an auto-exposure operation on a sequence of images, comprising:
      identifying pixels in the image that have repeatedly exceeded a saturation threshold;
      obtaining a histogram of an the image in which the identified pixels are excluded;
      applying a weighted histogram table to the histogram to obtain weighted tonal value bins wherein at least some bins in the histogram containing oversaturated pixels are assigned a higher weighting value and at least some bins in the histogram containing non-saturated pixels are assigned a lower weighting value ; and
      summing the weighted histogram bins to obtain a saturation score and decreasing an auto exposure target for an auto exposure operation when the saturation score indicates that the image is oversaturated, and increasing the auto exposure target when the saturation score indicates that the image is non-saturated and when the image is underexposed.

14. The apparatus as claimed in claim 13 wherein the imager is an infrared imager.

15. A method comprising:
   identifying pixels in an image that exceed a saturation threshold a selected number of times over a time period as being static or mostly static background saturated pixels;
   storing information in a memory as to which pixels in the image are the identified pixels;
   employing the stored information to make calculations within a processor contained in a camera; and
   carrying out an exposure control operation in the camera based on the calculations.

16. The method as claimed in claim 15 wherein the identifying comprises reading a saturation level of a pixel and incrementing a counter when the pixel exceeds the saturation threshold and identifying the pixel as being a static or mostly static saturated background pixel when the counter exceeds a background saturated pixel threshold value.

17. A camera comprising:
   (a) an imager; and
   (b) processing circuitry communicative with the imager to receive an image captured by the imager, the processing circuitry comprising a processor and memory having encoded thereon program code executable by the processor to perform a method comprising:
      identifying pixels in the image that exceed a saturation threshold a selected number of times over a time period as being static or mostly static background saturated pixels;
      storing information in the memory as to which pixels in the image are the identified pixels;
      employing the stored information to make calculations within the processor; and
      carrying out an exposure control operation in the camera based on the calculations.

18. The camera as claimed in claim 17 wherein the processing circuitry is contained in a system on chip of the camera.

* * * * *